United States Patent
McLoughlin et al.

(10) Patent No.: US 6,855,777 B2
(45) Date of Patent: Feb. 15, 2005

(54) VERY LOW MELT VISCOSITY RESIN

(75) Inventors: Kimberly M. McLoughlin, Gibsonia, PA (US); Edwin B. Townsend, IV, Pittsburgh, PA (US); John A. Boettger, Monroeville, PA (US); Gary R. Tarr, Burgettstown, PA (US); Theodore Gabor, Pittsburgh, PA (US)

(73) Assignee: Sunoco, Inc. (R&M), Philadelphia, PA (US)

( * ) Notice: Subject to any disclaimer, the term of this patent is extended or adjusted under 35 U.S.C. 154(b) by 0 days.

(21) Appl. No.: 10/224,715

(22) Filed: Aug. 22, 2002

(65) Prior Publication Data

US 2004/0039130 A1 Feb. 26, 2004

(51) Int. Cl.$^7$ ............................. C08F 8/06; C08F 8/00
(52) U.S. Cl. .................................. 525/333.8; 525/387
(58) Field of Search .......................... 525/333.8, 387

(56) References Cited

U.S. PATENT DOCUMENTS

| | | | |
|---|---|---|---|
| 4,451,589 A | | 5/1984 | Morman et al. |
| 4,578,430 A | * | 3/1986 | Davison ..................... 525/387 |
| 4,897,452 A | * | 1/1990 | Berrier et al. ............ 525/333.8 |
| 5,594,074 A | * | 1/1997 | Hwo et al. .................. 525/387 |

FOREIGN PATENT DOCUMENTS

| | | |
|---|---|---|
| DE | 43 21 529 A1 | 1/1995 |
| EP | 0 063 654 A1 | 11/1982 |
| EP | 0 334 829 A1 | 9/1989 |
| EP | 0 891 989 A1 | 7/1998 |
| JP | 04 100807 | 4/1992 |
| JP | 04 168104 | 6/1992 |

OTHER PUBLICATIONS

Ethylene–propylene copolymers with high flow index. Popisil, Ladislav; Pac, Jiri; Petruj, Jaroslav; Sula, Karel; Ottis, Jiri; Sulc, Zdenek. Czech. CS 239,716 (Cl. C08F8/50), Apr. 15, 1987, Appl. 84/595, Jan. 26, 1984; 6 pp.

* cited by examiner

Primary Examiner—Ling-Siu Choi
(74) Attorney, Agent, or Firm—Robert A. Koons, Jr.; Matthew P. McWilliams; Buchanan Ingersoll PC

(57) ABSTRACT

A process is provided for the production of a very low melt viscosity (high melt flow index) polymer resin, suitable for use in meltblown processing. According to the process of the current invention, a high melt viscosity (low melt flow index) resin is subjected to post-reactor molecular weight alteration by extrusion with a chemical prodegradant. The process produces a very low melt viscosity resin that can be used in meltblown processing without further treatment to reduce the average molecular weight of the resin. Further, the very low melt viscosity resins produced according to the process of the current invention contain very little or no residual prodegradant.

27 Claims, No Drawings

VERY LOW MELT VISCOSITY RESIN

FIELD OF THE INVENTION

The present invention relates to polymer resins for use in meltblown processing. Specifically, the present invention relates to a process for the production of polymer resins with very low melt viscosity by post-reactor molecular weight alteration of high melt viscosity resins using prodegradants, where the final resins are suitable for meltblown processing without further preparation and contain low concentrations of or no residual prodegradants.

BACKGROUND OF THE INVENTION

It is well known in the art that it is a desirable processing property for polymer resins in meltblown processing to have a low viscosity when molten. For many commercial end-users, the melt-flow characteristics of standard, commercial polymer resins are not suitable because of their relatively high molecular weight, which results in a high melt viscosity. As low melt viscosity is desired, prior art references have sought to achieve low melt viscosity of polymer through controlled scission of the polymer chain. This controlled scission, in effect, reduces the post-reactor average molecular weight of the polymer chains. As the average molecular weight is reduced, the melt viscosity is lowered. Furthermore, the molecular weight distribution (MWD) is significantly altered.

It is well-known that polymer resins suitable for meltblown processing may be produced by preparing polymer with a relatively high melt viscosity and then subjecting it to a post-reactor molecular weight alteration using a chemical prodegradant, typically a free radical initiator, such as a peroxide. This degradation treatment occurs under such conditions that the melt viscosity of the polymer decreases to a specific value. However, when producing a pelletized polymer for future processing, this process has presented problems. U.S. Pat. Nos. 4,451,589; 4,897,452 and 5,594,074 all report that when peroxide treatment is used to produce a low melt viscosity polymer in a extrusion process, the resulting polymer is not easily pelletized. Specifically, the degraded polymer on exiting the extruder becomes so fluid and soft that it is difficult or impossible to cut into pellet form.

To avoid this problem, several processing techniques have used a degradation process involving a primary degradation wherein the average molecular weight of the polymer is reduced to a value above that desired for meltblown processing. The degradation is performed in an extruder wherein an additional amount of prodegradant remains impregnated in the pelletized polymer for further degradation. The additional prodegradant acts to further reduce the average molecular weight to the desired value during meltblown processing. U.S. Pat. No. 5,594,074 to Hwo, et al, U.S. Pat. No. 4,451,589 to Morman, et al and U.S. Pat. No. 4,897,452 to Berrier, et al all describe processes for making polymer pellets containing an unreacted free radical initiator. Using the impregnated free radical initiator, the polymers can be further degraded upon thermal treatment to form an ultra low melt viscosity polyolefin. U.S. Pat. No. 4,897,452 describes a process for the manufacture of propylene homopolymer or copolymer pellets in the presence of a primary and secondary free radical initiator, wherein the half-life of the second free radical initiator is at least twenty times longer than that of the first free radical initiator. In that invention at least 80% by weight of the second free radical initiator, and not more than 20% by weight of first free radical initiator remain intact in the pellets and available for subsequent decomposition during the conversion of the pellets into finished articles.

Another method consists of higher melt viscosity reactor granules that are coated with peroxide so that they crack to lower melt viscosity during meltblown processing. In all cases, the un-reacted peroxide cracks the polymer to low melt viscosity during meltblown processing.

However, materials having prodegradants either impregnated into or coated onto pelletized polymer have some disadvantages. In particular, there is a danger that the residual prodegradant within the polymer will react early, either before it gets to the end-user or before the end-user processes it. As a result, various lots of the polymer material may behave with a degree of inconsistency.

It is also known to produce polymer having a low melt viscosity directly from an in-reactor process. In this case no post-reactor molecular weight alteration is required, as the desired melt viscosity property is produced directly by the in-reactor polymerization of the monomer. A draw back of resins produced by in-reactor processes is that they are supplied in a flake rather than pellet form, resulting in the presence of a significant amount of powdery fines, which create difficulties in handling and transporting the material. Finally, in-reactor processing is not a viable option for a number of meltblown fabric processors that lack the particular conveying systems necessary to transport materials supplied in flake form.

Therefore, it would be desirable to provide a process for producing a polymer resin that has low melt viscosity and good melt flow in meltblown processing. A polymer resin produced by such a process would have a low melt viscosity, as measured by melt flow index, in combination with a low residual content of prodegradant. Such material would be provided fully or nearly fully reacted prior to melt blown processing. Such material would also be provided in a pellet form for easy handling and transport.

SUMMARY OF THE INVENTION

The present invention provides a process for producing a homopolymer or copolymer resin having a melt flow index of greater than 1000 dg/min. and containing less than 300 ppm of residual prodegradant. The polymer resin produced according to the process of the present invention can be used to produce a fiber that can be incorporated into a non-woven fabric and can be processed on a meltblown line to form a fabric ("web") using standard commercial processing conditions and rates. The polymer resin of the current invention provides improved melt viscosity homogeneity during meltblown processing relative to granules or pellets coated or impregnated with prodegradants, such as free radical initiators.

The process of the current invention further provides improved lot-to-lot consistency relative to products that contain substantial amounts of un-reacted peroxides or other prodegradants, which can react during shipping and storage, initiating degradation that results in unpredictable melt viscosity.

The process according to the current invention is applicable to a variety of polyolefin homopolymers and copolymers. In a preferred embodiment, the high melt flow index polymer resin produced is a polypropylene homopolymer, or random or block copolymer.

DETAILED DESCRIPTION OF THE INVENTION

The invention provides a process for producing polymer resins with low melt viscosity, suitable for melt blown processing. The process provides polymer resins having a melt flow index of greater than 1000 dg/min. Preferably, the melt flow index of the resin is from 1000 dg/min. to 2500 dg/min. Additionally, the polymer resins produced according to the invention contain less than 300 ppm of residual prodegradant, preferably, less than 50 ppm.

Further, polymer resins produced according to the invention have relatively narrow molecular weight distributions (MWDs), as defined by the function:

$$MWD=Mw/Mn$$

where: Mw=weight average molecular weight
Mn=simple average molecular weight

In general, polymer resins produced according to the invention typically have molecular weight distributions of less than 3.0.

According to the process of the present invention a high melt flow index polymer resin is produced by extruding a low melt flow index polymer powder with a prodegradant to initiate controlled degradation that results in a reduction of the average molecular weight of the polymer, providing a final product that has a melt flow index of greater than 1000 dg/min. and containing minimal residual prodegradant. According to one embodiment of the invention, polymer reactor granules are combined with additives. The polymer powder/additive blend is then fed into an extruder. The prodegradant is combined with the powder/additive during extrusion by injecting it directly into the extruder, either at the feed throat or through an opening in the barrel, preferably as a solution. According to an alternate embodiment, a prodegradant may be dry-blended with the polymer powder/additive blend before extrusion. Further, the additives may be added as a solution with the prodegradant, by injection into the molten resin during extrusion. Regardless of how the prodegradant or additional additives are added, at the elevated extrusion temperatures the prodegradant initiates controlled degradation that decreases the average molecular weight of the polymer. Vacuum devolitazation can be applied to the extruder barrel to remove any un-reacted prodegradant along with residual solvents. The resin leaves the extruder through a die and is then quenched by a water bath and chopped into pellets. The molecular weight reduction obtained results in a very low melt viscosity, as measured by melt flow index.

According to an alternative embodiment of the invention, a low melt viscosity polymer resin may be produced through a two stage process, which begins by performing a first stage extrusion process as described above, resulting in polymer pellets with a final melt flow index of approximately 300 to 700 dg/min. The resulting polymer pellets then enter the second stage of the process which is identical to the first stage except that the starting material is the polymer pellet produced from the first stage processing. Specifically, the first stage polymer pellets of approximately 300 to 700 dg/min melt flow index are fed into the extruder where they are extruded with a prodegradant and vacuum devolatized to remove residual prodegradant. The resin then proceeds to a water bath followed by drying with an air knife and then proceeds to a strand pelletizer. This second stage extrusion process results in polymer pellets with a final melt flow index of approximately 1000 dg/min. or greater and less than 300 ppm of residual prodegradant. As with the one stage process, the polymer may be dry mixed with the prodegradant prior to extrusion.

Polymer resins that can be used as raw materials in the process of the current invention typically have melt flow indices of 60 or greater, but they may be as low as 0.7. Preferably, the prodegradant is added to the raw polymer resin in concentrations from 0.1 to 2.0 percent by weight, based on the weight of polymer. It will be apparent to those skilled in the art that the process of the present invention is not limited to a particular prodegradant or class of prodegradant. A number of prodegradants, including free radical initiators, such as organic peroxides, are useful with the present invention. The class of organic peroxides includes, but is not limited to: TRIGONOX 101® (2,5-dimethyl-2,5-di-[tert-butylperoxyl]hexane) and TRIGONOX 301® (3,6,9-triethyl-3,6,9-trimethyl-1,4,7-triperoxonane), both available from AKZO and (di-tert-amyl peroxide), available from CK Witco as DTAP® and from AKZO as Trigonox 201®. Additionally, a number of additives may be used with the current invention, including, but not limited to: antioxidants, processing stabilizers, and acid scavengers. Examples of additives that are useful in the current invention are: IRGAFOS 168® (tris-[2,4-di-tert-butylphenyl] phosphite) and IRGANOX 1076® (octadecyl-3,5-di-tert-butyl-4-hydroxyhydrocinnamate), both available from CIBA, and zinc oxide and calcium stearate.

High melt flow index polymer resins produced according to the current invention contrast with commercial meltblown resins, which contain an un-reacted peroxide that initiates resin degradation during meltblown processing. The fully reacted resins produced by the process of the current invention are expected to exhibit improved melt viscosity consistency over current commercial products.

EXAMPLES 1–5

One Step Process

Five samples of low melt viscosity polypropylene resin were produced using the single extrusion process. The initial melt flow indices (MFIs) of the resins put into the process were from 0.7 to 60. Table 1 shows the properties of the resins that were input into these five trials.

TABLE 1

Molecular Weight Distributions of Starting Materials

| starting material | MFI | Mn (Kg/mole) | Mw (Kg/mole) | Mw/Mn |
| --- | --- | --- | --- | --- |
| granules | 0.7 | 82 | 473 | 5.9 |
| granules | 18 | 44 | 205 | 4.7 |
| granules | 60 | 37 | 155 | 4.15 |

Examples were run using 30 mm, 43 mm and 240 mm extruders. The quantity of peroxide fed to the extruder varied from 0.31 to 1.2 weight percent. The polypropylene powder was dry-blended with a peroxide and fed to the hopper of the extruder. For the trials on the 43 mm extruder, the barrel temperature at the hopper was set to 350° F. and increased along the barrel to 450° F. at the vacuum port, which was located just upstream of the die. The die temperature was set to 375° F. After extrusion, the samples were quenched and pelletized. Table 2 details the properties of the low melt viscosity polymers produced in each trial.

TABLE 2

Processing Conditions and Properties

| Example | 1 | 2 | 3 | 4 | 5 |
|---|---|---|---|---|---|
| Extruder | 30 mm | 30 mm | 240 mm | 43 mm | 43 mm |
| starting MFI | 0.7 | 60 | 18 | 18 | 18 |
| final MFI | 1600 | 1500 | 1000 | 1400 | 2210 |
| residual peroxide | <50 ppm | <50 ppm | <50 ppm | 15 ppm | 25 ppm |
| Mn | 30 | 24 | 34 | 24 | 22.5 |
| Mw | 57 | 58 | 91 | 57 | 51 |

Extruder barrel temperature settings are critical to forming a product that contains minimal un-reacted prodegradant. The prodegradant decomposition rate (i.e. the rate at which the prodegradant initiates controlled degradation of the polymer) is specified by its half-life, which decreases exponentially as temperature increases. The process temperature must be high enough to provide a half-life that is substantially shorter than the residence time of the extruder. In general, the residence time of the material in the extruder should be at least five times the half-life of the prodegradant. The residence time is determined by the extruder size, screw design, and throughput. The throughput rate and devolatilization vacuum pressure were varied to measure the effects of those parameters on product molecular weight and residual prodegradant. The data in Table 3 indicate that for the above examples the best residual peroxide levels were obtained using the 43 mm extruder.

TABLE 3

Extrusion Conditions for Producing Resins with the Desired Melt Flow Viscosity

| screw speed (rpm) | throughput (kg/hr) | vacuum (in Hg) | residence time (s) | Die T (F) | half-life (sec) |
|---|---|---|---|---|---|
| 150 | 27 | 5 | 41 | 390 | 6 |

EXAMPLES 6 AND 7

Two Step Process

Two samples of low melt viscosity resin were produced from polypropylene pellets produced by extruding polypropylene homopolymer reactor granules in the presence of a peroxide to induce controlled reduction of the average molecular weight. One had a melt flow of 300 dg/min and the other had a melt flow of 600 dg/min. The molecular weight distributions of low melt viscosity pellets produced from pellet starting materials are provided in Table 4.

TABLE 4

Molecular Weight Distributions of Starting Materials

| starting material | MFI | Mn (Kg/mole) | Mw (Kg/mole) | Mw/Mn |
|---|---|---|---|---|
| pellets | 300 | 36 | 111 | 3.1 |
| pellets | 600 | 34 | 96 | 2.9 |

The processing conditions and properties for the low melt viscosity polypropylene resins produced in these trials is shown in Table 5.

TABLE 5

Processing Conditions and Properties

| Extruder | 43 mm | 43 mm |
|---|---|---|
| starting MFI | 340 (pellet) | 643 (pellet) |
| final MFI | 1503 | 1470 |
| residual peroxide | 160 ppm | 75 ppm |
| Mn | 24.8 | 23.7 |
| Mw | 60 | 59 |
| Mw/Mn | 2.4 | 2.5 |

The foregoing examples using polypropylene homopolymers have been provided for illustrative purposes only and should not be construed as limiting the scope of the invention. Those skilled in the art will recognize that the process of the current invention can be applied to a variety of block and random copolymers of polypropylene and other polymers. The process according to the current invention has been practiced successfully with polymers of both standard and high isotacticity. Additionally, the prodegradants and additive packages used in the examples are only for illustrative purposes. The process of the current invention can be used successfully with various prodegradants and additive packages. The full scope of the invention will be clear to those skilled in the art from the claims appended hereto.

What is claimed is:

1. A process for producing a high melt flow index polymer, said high melt flow index polymer having a melt flow index of at least 1000 dg/min and containing less than 300 ppm of a prodegradant, said process comprising the steps of:
   providing a low melt flow index polymer;
   adding at least one additive to said low melt flow index polymer;
   adding at least one prodegradant to said low melt flow index polymer;
   extruding said low melt flow index polymer in an extruder at an elevated temperature to initiate controlled molecular weight reduction of said low melt index polymer to form said high melt flow index polymer; and
   quenching and pelletizing said high melt flow index polymer.

2. The process of claim 1, wherein said at least one prodegradant is dry mixed with said low melt flow index polymer prior to said extruding.

3. The process of claim 1, wherein said at least one prodegradant is added to said low melt flow index polymer as a solution during said extruding.

4. The process of claim 3, wherein said at least one prodegradant is added by injecting at the feed throat of an extruder.

5. The process of claim 3, wherein said at least one prodegradant is added by injecting into the barrel of an extruder.

6. The process of claim 1, wherein said high melt flow index polymer contains less than 50 ppm of a prodegradant.

7. The process of claim 1, wherein said at least one prodegradant comprises an organic peroxide.

8. The process of claim 1, wherein said at least one additive is selected from the group consisting of: antioxidants, processing stabilizers, and acid scavengers.

9. The process of claim 1, further comprising the step of removing unreacted prodegradant from said high melt flow index polymer.

10. The process of claim 9, wherein said unreacted prodegradant is removed by vacuum devolitazation.

11. The process of claim 10, wherein said vacuum devolitazation is accomplished by applying a vacuum to the barrel of said extruder during extruding.

12. The process of claim 1, wherein said low melt flow index polymer has a melt flow index of 100 dg/min or less.

13. The process of claim 1, wherein said low melt flow index polymer has a melt flow index of 700 dg/min or less.

14. The process according to claim 1, wherein the residence time of the polymer in said extruder is less than 60 seconds.

15. The process of claim 1, wherein said extruding is performed at a temperature from about 325° F. to about 475° F.

16. The process of claim 1, wherein said prodegradant is added in a quantity of from about 0.2 to about 2.0 percent by weight, based on the weight of low melt index polymer.

17. The process of claim 1, wherein said low melt flow index polymer is a polypropylene resin.

18. The process of claim 17, wherein said polypropylene resin is a random or block copolymer.

19. The process of claim 17, wherein said polypropylene resin is a high isotacticity resin.

20. The process of claim 1, wherein said high melt flow index polymer has a molecular weight distribution of from about 1.9 to about 2.9.

21. A pelletized high melt flow index polymer having a melt flow index of at least 1000 dg/min and containing less than 300 ppm of prodegradant;

said high melt flow index polymer being produced by controlled degradation of a low melt flow index polymer;

said controlled degradation being accomplished by extruding a low melt flow index polymer with at least one prodegradant.

22. The pelletized high melt flow index polymer according to claim 21, having a melt flow index of from 1000 dg/min to 2500 dg/min.

23. The pelletized high melt flow index polymer according to claim 21, containing less than 50 ppm of prodegradant.

24. The pelletized high melt flow index polymer according to claim 21, having a molecular weight distribution of from about 1.9 to about 2.9.

25. The pelletized high melt flow index polymer according to claim 21, wherein said polymer is a polypropylene resin.

26. The pelletized high melt flow index polymer according to claim 25, wherein said polypropylene resin is a random or block copolymer.

27. The pelletized high melt flow index polymer according to claim 25, wherein said polypropylene is a high isotacticity polypropylene resin.

* * * * *